US010587530B2

(12) United States Patent
Baker et al.

(10) Patent No.: US 10,587,530 B2
(45) Date of Patent: *Mar. 10, 2020

(54) AUTOMATICALLY CONFIGURING COMPUTER NETWORK AT HOSPITALITY ESTABLISHMENT WITH RESERVATION-SPECIFIC SETTINGS

(71) Applicant: Guest Tek Interactive Entertainment Ltd., Calgary (CA)

(72) Inventors: Andrew B. Baker, Airdrie (CA); Joshua M. Wookey, Calgary (CA); David T. Ong, Calgary (CA); Difan Zhao, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/054,151

(22) Filed: Aug. 3, 2018

(65) Prior Publication Data
US 2019/0028404 A1 Jan. 24, 2019

Related U.S. Application Data

(63) Continuation of application No. 15/653,743, filed on Jul. 19, 2017, now Pat. No. 10,069,754, which is a (Continued)

(30) Foreign Application Priority Data

May 8, 2012 (CA) ..................................... 2775804

(51) Int. Cl.
*G06F 21/00* (2013.01)
*H04L 12/911* (2013.01)
(Continued)

(52) U.S. Cl.
CPC .......... *H04L 47/781* (2013.01); *G06Q 10/02* (2013.01); *G06Q 10/025* (2013.01);
(Continued)

(58) Field of Classification Search
CPC ..... H04L 63/02; H04L 63/0263; H04L 63/10; H04L 63/108; H04L 47/781;
(Continued)

(56) References Cited

U.S. PATENT DOCUMENTS 6,876,668 B1 4/2005 Chawla et al.
7,061,393 B2 6/2006 Buckingham et al.
(Continued)

FOREIGN PATENT DOCUMENTS

CA 2714224 C 11/2010
CA 2714227 C 11/2010
(Continued)

OTHER PUBLICATIONS

Stephani Lewis, iPASS Open Mobile Client, Nov. 20, 2009.
(Continued)

*Primary Examiner* — Kendall Dolly
(74) *Attorney, Agent, or Firm* — ATMAC Patent Services Ltd.; Andrew T. MacMillan

(57) ABSTRACT

A system includes a storage device for storing details of a plurality of reservations of a hospitality establishment. A particular reservation includes a set of reservation-specific settings affecting behavior of the computer network at the hospitality establishment during the reservation. The settings may include a registered device setting for affecting behavior of a computer network at the hospitality establishment toward a user device having a specified device identifier. The system further includes a clock unit for tracking time, and a system controller coupled to the computer network and having access to the storage device and the
(Continued)

clock unit. The system controller automatically configures one or more network components of the computer network when a start time of the particular reservation is reached in order to activate the reservation-specific settings.

20 Claims, 8 Drawing Sheets

Related U.S. Application Data continuation of application No. 15/346,976, filed on Nov. 9, 2016, now Pat. No. 9,742,691, which is a continuation of application No. 15/008,935, filed on Jan. 28, 2016, now Pat. No. 9,526,063, which is a continuation of application No. 14/456,148, filed on Aug. 11, 2014, now Pat. No. 9,288,692, which is a continuation of application No. 13/603,901, filed on Sep. 5, 2012, now Pat. No. 8,813,211.

(51) Int. Cl.
| | |
|---|---|
| *H04L 12/24* | (2006.01) |
| *G06Q 10/02* | (2012.01) |
| *G06Q 50/12* | (2012.01) |
| *H04L 29/06* | (2006.01) |
| *H04W 24/02* | (2009.01) |
| *G06Q 10/10* | (2012.01) |
| *H04W 28/26* | (2009.01) |
| *H04W 48/10* | (2009.01) |
| *H04L 12/873* | (2013.01) |
| *H04L 12/927* | (2013.01) |

(52) U.S. Cl.
CPC ......... *G06Q 10/1095* (2013.01); *G06Q 50/12* (2013.01); *H04L 41/0803* (2013.01); *H04L 41/0809* (2013.01); *H04L 41/0886* (2013.01); *H04L 41/0896* (2013.01); *H04L 47/528* (2013.01); *H04L 47/808* (2013.01); *H04L 47/826* (2013.01); *H04L 47/828* (2013.01); *H04L 63/10* (2013.01); *H04W 24/02* (2013.01); *H04W 28/26* (2013.01); *H04W 48/10* (2013.01); *H04L 63/02* (2013.01); *H04L 63/0263* (2013.01); *H04L 63/108* (2013.01)

(58) Field of Classification Search
CPC ... H04L 47/828; H04L 47/826; H04L 47/808; H04L 47/528; H04L 41/0896; H04L 41/0886; H04L 41/0803; H04L 41/0809; H04W 48/10; H04W 28/26; H04W 24/02; G06Q 10/1095; G06Q 10/025; G06Q 50/12; G06Q 10/02
See application file for complete search history.

(56) References Cited

U.S. PATENT DOCUMENTS

| | | | |
|---|---|---|---|
| 7,324,463 | B2 | 1/2008 | Takada et al. |
| 7,733,776 | B1 | 6/2010 | Lee et al. |
| 8,813,211 | B2 | 8/2014 | Baker et al. |
| 9,288,692 | B2 | 3/2016 | Baker et al. |
| 9,526,063 | B2 | 12/2016 | Baker et al. |
| 9,697,369 | B2 | 7/2017 | Ong |
| 9,742,691 | B2 | 8/2017 | Baker et al. |
| 10,069,754 | B2 | 9/2018 | Baker |
| 2002/0004833 | A1* | 1/2002 | Tonouchi ............... H04L 29/06 709/229 |
| 2003/0236881 | A1 | 12/2003 | Tanaka |
| 2004/0116115 | A1 | 6/2004 | Ertel |
| 2005/0021777 | A1 | 1/2005 | Nakao et al. |
| 2005/0091539 | A1 | 4/2005 | Wang et al. |
| 2005/0246447 | A1 | 11/2005 | Smidt et al. |
| 2006/0075123 | A1 | 4/2006 | Burr et al. |
| 2006/0155563 | A1 | 7/2006 | Banerjee et al. |
| 2006/0268824 | A1 | 11/2006 | Dhesikan et al. |
| 2007/0176739 | A1 | 8/2007 | Raheman |
| 2008/0089277 | A1 | 4/2008 | Alexander et al. |
| 2008/0091726 | A1 | 4/2008 | Koretz et al. |
| 2008/0112370 | A1 | 5/2008 | Kwon |
| 2008/0271109 | A1 | 10/2008 | Singh et al. |
| 2009/0025055 | A1 | 1/2009 | White et al. |
| 2009/0271281 | A1 | 10/2009 | Kang |
| 2010/0058455 | A1 | 3/2010 | Irudayaraj et al. |
| 2010/0115113 | A1 | 5/2010 | Short et al. |
| 2010/0153532 | A1* | 6/2010 | Ozawa ............... H04L 67/125 709/223 |
| 2010/0191551 | A1 | 7/2010 | Drance et al. |
| 2011/0022695 | A1 | 1/2011 | Dalal et al. |
| 2011/0058455 | A1 | 3/2011 | Dalal et al. |
| 2011/0099598 | A1 | 4/2011 | Shin et al. |
| 2011/0182303 | A1 | 7/2011 | Le Faucheur et al. |
| 2011/0314502 | A1 | 12/2011 | Levy et al. |
| 2013/0305341 | A1 | 11/2013 | Baker et al. |

FOREIGN PATENT DOCUMENTS

| | | | |
|---|---|---|---|
| WO | 2011/005710 A2 | 1/2011 | |
| WO | WO-2011005710 A2 * | 1/2011 | ......... H04L 12/4641 |
| WO | 2011/005710 A3 | 4/2011 | |

OTHER PUBLICATIONS

Guest Tek Interactive Entertainment Ltd., Release Notes OneView Internet Version 62, Sep. 15, 2011.
Crestron Electronics Inc., Hospitality, Printed in USA; Doc. 4745A Jul. 2009.

* cited by examiner

Reservation-specific network settings — 200

General settings

- 202 Reservation ID — 3421
- 204 Description — Medical conference
- 206 Start time — 2011/11/02 10:00 [Adjust]
- 208 End time — 2011/11/02 21:00 [Adjust]
- 210 Location(s):
  1. Meeting room A [Remove]
  2. Meeting room B [Remove]
  3. Meeting room C [Remove]
  [Add new room]
- 212 SSID — "Medical_peer_conference"
- 214 Require login — ● Yes  ○ No
- 216 Login portal — http://login23.globalsuite.com
- 218 Meeting passcode — M783A
- 220 Walled garden site(s) — http://hotelhomepage.example.com
  http://reservations.example.com
- 222 Bandwidth limits (Mbit/s) — Cap 30  Rate 10
- 224 User isolation — ● Yes  ○ No
- 226 Required # of public IP(s) — 1

Registered device settings

| 228 Device name | 230 Device ID | 232 Auto login | 234 User shared | 236 Mbit/s limits Cap | Rate | 238 Public IP |
|---|---|---|---|---|---|---|
| 240 Printer | 00:08:C7:1B:8C:02 | ☐ | ☒ | | | |
| 242 Cam | 09:a1:47:12:efg:31 | ☒ | ☐ | 5 | 5 | 69.46.103.131 |

[Add new device]   [Save]  [Cancel]

FIG. 2

Example location table

*142*

| Location | Component type | IP address | Port # |
|---|---|---|---|
| Meeting room A | Access point (AP) | 10.10.2.1 | - |
| | Access point (AP) | 10.10.2.3 | - |
| | Access point (AP) | 10.10.2.4 | - |
| | Access point (AP) | 10.10.2.5 | - |
| | Switch | 10.10.1.2 | 1 |
| | | | 2 |
| | | | 3 |
| | | | 4 |
| | | | 5 |
| Meeting room B | Access point (AP) | 10.10.2.1 | - |
| | Access point (AP) | 10.10.2.3 | - |
| | Access point (AP) | 10.10.2.12 | - |
| | Switch | 10.10.1.3 | 1 |
| | | | 2 |
| | | | 3 |
| | | | 4 |
| | | | 5 |
| | Switch | 10.10.1.2 | 6 |
| | | | 7 |
| | | | 8 |
| | | | 9 |
| Meeting room C | Access point (AP) | 10.10.2.12 | - |
| ⋮ | ⋮ | ⋮ | ⋮ |

Activating reservation-specific network settings to share printer

150

Reservation-specific DHCP server settings

| VLAN | MAC (device) | IP address range for assignment |
|---|---|---|
| 1123 | 00:08:C7:1B:8C:02 (printer) | 192.168.1.0-192.168.1.254 (shared range) |
| 1123 | - | 192.168.0.0-192.168.0.254 (isolated range) |
| ⋮ | ⋮ | ⋮ |

Columns: 700, 702, 704

160

Reservation-specific gateway/firewall settings

| VLAN | Source | Destination | Action |
|---|---|---|---|
| 1123 | 192.168.1.0-192.168.1.255 (shared range) | - | Pass |
| 1123 | - | 192.168.1.0-192.168.1.255 (shared range) | Pass |
| 1123 | 192.168.0.0-192.168.0.255 (isolated range) | 192.168.0.0-192.168.0.255 (isolated range) | Drop |
| ⋮ | ⋮ | ⋮ | ⋮ |

Columns: 710, 712, 714, 716

FIG. 7

Modify user profile settings for: Josh Wookey

User devices associated with this account:

| User device | MAC address (Device ID) | |
|---|---|---|
| Mobile phone | 00-E4-A1-32-C3-39 | Remove |
| Corporate netbook | 20-B0-D0-86-BB-F9 | Remove |
| Teleconferencing webcam | 71-FE-D0-26-A1-03 | Remove |

(Add new device)

Loyalty program membership numbers associated with this account:

| Hospitality establishment (Site ID) | Loyalty program # (User ID) | User type (Access entitlement) | |
|---|---|---|---|
| Galactic Hotel (4) | 122-32-2345 | Regular | Remove |
| Centennial Airlines (35) | ABF334401 | Regular | Remove |
| Beaches Resort (135) | 5E3DA7 | VIP | Remove |
| Waterfront park (139) | 4391 | Regular | Remove |
| Terminal bus lines (144) | 2010-01-01-39 | Regular (upgrade) | Remove |

(Add new location)

Save   Cancel

FIG. 8

AUTOMATICALLY CONFIGURING COMPUTER NETWORK AT HOSPITALITY ESTABLISHMENT WITH RESERVATION-SPECIFIC SETTINGS

CROSS-REFERENCE TO RELATED APPLICATIONS

This application is a continuation of U.S. patent application Ser. No. 15/653,743 filed Jul. 19, 2017, which is a continuation of U.S. patent application Ser. No. 15/346,976 filed Nov. 9, 2016, which is a continuation of U.S. patent application Ser. No. 15/008,935 filed Jan. 28, 2016, which is a continuation of U.S. patent application Ser. No. 14/456,148 filed Aug. 11, 2014, which is a continuation of U.S. patent application Ser. No. 13/603,901 filed Sep. 5, 2012, which claims the benefit of Canadian Patent Application No. 2,775,804 filed May 8, 2012. All of these applications are incorporated herein by reference.

BACKGROUND OF THE INVENTION

(1) Field of the Invention

The invention pertains generally to configuring computer networks. More specifically, the invention relates to automatically configuring computer networks at hospitality establishments such as hotels and resorts with reservation-specific settings.

(2) Description of the Related Art

Hospitality establishments such as hotels and resorts typically provide high speed Internet access (HSIA) to guests. Often a hospitality establishment desires to provide guests with HSIA using a computer network installed on the premises but does not wish to design or support the network. In this situation, the hospitality establishment may contract an external vendor to provide an HSIA solution.

An example of a vendor-provided HSIA solution is the One View Internet™ (OVI) system by Guest-tek™. To begin an HSIA session at a hotel employing the OVI system, a guest connects a user device to the hotel's computer network, either through a physical cable such as Ethernet or a wireless connection such as WiFi™, and opens a web browser to access a website on the Internet. Instead of allowing user devices immediate access to the Internet, the OVI system acts as a captive portal and requires the guest to first log in at a predetermined login portal. To this end, a firewall controlling access between the local area network (LAN) of the hotel and the Internet includes a default rule that causes unauthorized user devices to display the login portal in the web browser.

At the login portal the guest signs up for Internet access. When the guest is an attendee of an event being held at the hotel such as a meeting or conference, the guest enters a meeting passcode known only to attendees of the event in order to sign in. The OVI system checks the meeting passcode entered by the user to determine whether it matches that of an active event currently being held at the hospitality establishment. When the guest is an individual staying at the hotel, the guest enters their room number and other personal details, selects a desired bandwidth level and other options such as access duration etc., provides payment information, and performs other actions such as agreeing to terms and conditions. The OVI system only authorizes the user device to access the Internet after the guest has successfully completed the login process at the login portal.

To authorize a particular user device for HSIA after the login process has been completed, the OVI system adds a device-specific rule to the firewall that allows data to flow between the Internet and the unique media access control (MAC) address of the particular user device. In this way, only user devices from which guests of the hotel have properly logged in at the login portal are provided HSIA.

However, some user devices brought to hotels are unable to be logged in at a web-based login portal because the devices either do not include web browsing technology or do not permit the guest to access the login portal.

Examples of user devices that do not include web browsing technology include standalone teleconferencing web cam appliances, routers, Internet Protocol (IP) telephones, and other IP-enabled devices that lack a user interface capable of displaying the login portal or allowing the guest to enter the required login information. Because these devices are not capable of utilizing the web-based login portal, they cannot be logged in and do not gain Internet connectivity at the hotel.

Examples of user devices that do not permit the guest to access the login portal include locked-down corporate and military laptops and equipment that is configured to only connect with a designated destination such as a fixed server address accessed via a company or military virtual private network (VPN). Although these devices may include web browsers that are technically capable of displaying a login portal, due to security concerns, the device may be configured to actively ignore or block any attempts to cause the device to display the hotel's login portal. Typically the users of such devices have no administrator rights to modify or override these security settings. Therefore, these devices also cannot be logged in at the login portal and do not gain Internet connectivity at the hotel.

When a guest is unable to log in from a particular user device at the login portal such as in the above-described situations, the guest needs to contact support staff to request that the user device be manually cleared through the hotel's firewall in order to receive HSIA. Often the guest will not realize that manual intervention by support staff is required and may waste significant time attempting to troubleshoot the lack of Internet connectivity on their own. When the guest finally does call technical support for assistance, the guest may not be ready to provide support staff with the device's unique MAC address, which is required in order to manually add a device-specific exception allowing Internet access to the firewall. Helping the guest determine their device's unique MAC address delays call center staff in resolving the problem and moving onto a next support call.

Manual adjustment of firewall rules by support staff in order to give certain user devices Internet access both increases the support costs of the hospitality establishment's HSIA system and negatively impacts the guest experience. It would be desirable to be able to automatically activate the HSIA service for these devices.

iPass Incorporated offers the iPass Open Mobile Client™ that when installed on a user device automatically logs in the user device upon arrival at an iPass-enabled hotspot or Internet access provider such as a hotel. However, in order for the iPass Open Mobile Client to automatically log in a new user for Internet access, the user (or the user's employer in the case of a corporate device) must have previously signed up for an iPass account and purchased an amount of Internet access in advance. The user also must have previously installed and configured the iPass Open Mobile Client software on their device, which may not be possible for devices unsupported by iPass's client software or for which the user does not have sufficient access rights to install software (e.g., a locked-down corporate/military devices).

International Patent Publication No. WO2011005710 A2 discloses a system that allows zones and migration rules between the zones to be configured within a hotel. When a rule is configured to allow migration from a first zone to a second zone, guests already logged into the first zone may migrate to the second zone without being forced to re-log in. However, this system still requires the user to first log in and gain access to an initial zone upon arrival at the hotel. Only after the user has logged in from the initial zone will the system allow the user to migrate to certain other zones in the hotel without being required to re-log in.

BRIEF SUMMARY OF THE INVENTION

According to an exemplary embodiment of the invention a computer network of a hospitality establishment is automatically configured with reservation-specific network settings. A set of reservation-specific network settings for a particular reservation includes a registered device setting specifying a device identifier of a user device that needs Internet connectivity while at the hospitality establishment. By automatically activating the set of reservation-specific network settings when a start time of the reservation is reached, the device identifier such as the unique MAC address of the registered user device is cleared through the firewall. By automatically deactivating the set of reservation-specific network settings when an end time of the reservation is reached, the registered user device is prevented Internet access after the reservation has ended. An advantage of this embodiment is the registered user device is automatically provided high speed Internet access (HSIA) during the active duration of the reservation without requiring the device to log in at a web-based login portal.

According to another exemplary embodiment of the invention there is disclosed a system including a storage device for storing details of a plurality of reservations of a hospitality establishment. A particular reservation of the stored reservations includes a registered device setting for affecting behavior of a computer network at the hospitality establishment toward a user device having a specified device identifier. The system further includes a clock unit for tracking time, and a system controller coupled to the computer network and having access to the storage device and the clock unit. The system controller automatically configures one or more network components of the computer network when a start time of the particular reservation is reached in order to activate the registered device setting, and automatically configures the one or more network components when an end time of the particular reservation is reached in order to deactivate the registered device setting.

According to another exemplary embodiment of the invention there is disclosed a method of configuring a computer network of a hospitality establishment. The method includes storing details of a plurality of reservations of the hospitality establishment, wherein a particular reservation of the stored reservations includes a registered device setting for affecting behavior of the computer network toward a user device having a specified device identifier. The method further includes tracking time with a clock unit, and automatically configuring one or more network components of the computer network when a start time of the particular reservation is reached in order to activate the registered device setting. The method further includes automatically configuring the one or more network components when an end time of the particular reservation is reached in order to deactivate the registered device setting.

According to another exemplary embodiment of the invention there is disclosed a tangible computer-readable medium comprising computer executable instructions that when executed by a computer cause the computer to perform the above-described method.

According to another exemplary embodiment of the invention there is disclosed an apparatus including a storage device for storing details of a plurality of reservations of a hospitality establishment, wherein a particular reservation of the stored reservations includes a registered device setting for affecting behavior of a computer network at the hospitality establishment toward a user device having a specified device identifier. The apparatus further includes means for tracking time, means for automatically configuring one or more network components of the computer network when a start time of the particular reservation is reached in order to activate the registered device setting, and means for automatically configuring the one or more network components when an end time of the particular reservation is reached in order to deactivate the registered device setting.

According to another exemplary embodiment of the invention there is disclosed a computer server including a storage device for storing details of a plurality of reservations of a hospitality establishment. A particular reservation of the stored reservations includes a registered device setting for affecting behavior of a computer network at the hospitality establishment toward a user device having a specified device identifier. The computer server further includes a network interface coupled to the computer network, a clock unit for tracking time, and one or more processors coupled to the storage device, the network interface, and the clock unit. The one or more processors are configured to automatically configure one or more network components of the computer network when a start time of the particular reservation is reached in order to activate the registered device setting, and to automatically configure the one or more network components when an end time of the particular reservation is reached in order to deactivate the registered device setting.

According to another exemplary embodiment of the invention there is disclosed a system including a storage device storing details of a plurality of reservations of a hospitality establishment. A particular reservation of the stored reservations includes a user isolation setting. The system further includes a clock chip tracking time, a system controller coupled to a computer network at the hospitality establishment and having access to the storage device and the clock chip, and an access point coupled to the computer network and broadcasting a service set identifier (SSID) with which user devices may be wirelessly associated in order to utilize network resources made available during the particular reservation. When a start time of the particular reservation is reached, the system controller automatically configures the access point to selectively activate or deactivate client isolation for the SSID according to the user isolation setting of the particular reservation.

According to another exemplary embodiment of the invention there is disclosed a system including a storage device storing a plurality of stored reservations for a hospitality establishment. A particular reservation of the stored reservations includes a registered device setting for affecting behavior of a network at the hospitality establishment toward a user device having a specified device identifier. The registered device setting specifies that the user device having the specified device identifier is to have a custom bandwidth limit during the particular reservation. The system further includes a bandwidth manager coupled to the network, a clock chip tracking time, and a system controller coupled to the network and having access to the storage device and the clock chip. The system controller is operable to automatically configure the bandwidth manager via the network when a start time of the particular reservation is reached to thereby cause the bandwidth manager to limit a bandwidth of network traffic associated with the specified device identifier according to the custom bandwidth limit. The system controller is further operable to automatically configure the bandwidth manager when an end time of the particular reservation is reached to thereby cause the bandwidth manager to stop limiting the bandwidth of network traffic associated with the specified device identifier according to the custom bandwidth limit.

According to another exemplary embodiment of the invention there is disclosed a method of configuring a network of a hospitality establishment. The method includes storing a plurality of stored reservations for the hospitality establishment. A particular reservation of the stored reservations includes a registered device setting for affecting behavior of a network at the hospitality establishment toward a user device having a specified device identifier, and the registered device setting specifies that the user device having the specified device identifier is to have a custom bandwidth limit during the particular reservation. The method further includes tracking current time by a system controller, and automatically configuring a bandwidth manager via the network when a start time of the particular reservation is reached to thereby cause the bandwidth manager to limit a bandwidth of network traffic associated with the specified device identifier according to the custom bandwidth limit. The method further includes automatically configuring the bandwidth manager when an end time of the particular reservation is reached to thereby cause the bandwidth manager to stop limiting the bandwidth of network traffic associated with the specified device identifier according to the custom bandwidth limit.

According to another exemplary embodiment of the invention there is disclosed an apparatus including a storage device storing a plurality of stored reservations for a hospitality establishment. A particular reservation of the stored reservations includes a registered device setting for affecting behavior of a network at the hospitality establishment toward a user device having a specified device identifier, and the registered device setting specifies that the user device having the specified device identifier is to have a custom bandwidth limit during the particular reservation. The apparatus further includes a network interface coupled to the network, a clock chip tracking time, and one or more processors coupled to the storage device, the network interface, and the clock chip. By executing software instructions loaded from the storage device, the one or more processors are operable to automatically configure a bandwidth manager via the network when a start time of the particular reservation is reached to thereby cause the bandwidth manager to limit a bandwidth of network traffic associated with the specified device identifier according to the custom bandwidth limit. The one or more processors are further operable to automatically configure the bandwidth manager when an end time of the particular reservation is reached to thereby cause the bandwidth manager to stop limiting the bandwidth of network traffic associated with the specified device identifier according to the custom bandwidth limit.

According to another exemplary embodiment of the invention there is disclosed a controller for configuring reservation-specific network settings at a hospitality establishment. The controller includes a storage device storing a plurality of reservations for the hospitality establishment, a communications interface providing access to a computer network at the hospitality establishment, and a clock chip tracking time. The controller further includes one or more processors coupled to the storage device, the communications interface, and the clock chip. By the one or more processors executing software instructions loaded from the storage device, the one or more processors are configured to, when a start time of one of the reservations is reached, assign the one of the reservations to a virtual area network (VLAN) and dynamically configure a network component via the computer network to thereby cause the network component to place on the VLAN network traffic associated with one or more user devices accessing the computer network via the network component. The one or more processors are further configured to, when an end time of the one of the reservations is reached, de-assign the one of the reservations from the VLAN and dynamically configure the network component to thereby cause the network component to stop placing network traffic associated with the one or more user devices on the VLAN.

According to another exemplary embodiment of the invention there is disclosed a system for configuring reservation-specific network settings at a hospitality establishment. The system includes a storage device storing a plurality of reservations for the hospitality establishment, a network component providing access to a computer network at the hospitality establishment, a clock chip tracking time, and a controller coupled to the network component and having access to the storage device and the clock chip. When a start time of one of the reservations is reached, the controller automatically assigns the one of the reservations to a virtual area network (VLAN) and configures the network component to thereby cause the network component to place on the VLAN network traffic associated with one or more user devices gaining access to the computer network via the network component. When an end time of the one of the reservations is reached, the controller automatically de-assigns the one of the reservations from the VLAN and configures the network component to thereby cause the network component to stop placing network traffic associated with the one or more user devices on the VLAN.

According to another exemplary embodiment of the invention there is disclosed a method of configuring reservation-specific network settings at a hospitality establishment. The method includes storing a plurality of reservations for the hospitality establishment, providing access to a computer network at the hospitality establishment by a network component, and tracking time. The method further includes, when a start time of one of the reservations is reached, assigning the one of the reservations to a virtual area network (VLAN) and dynamically configuring the network component to thereby cause the network component to place on the VLAN network traffic associated with one or more user devices gaining access to the computer network via the network component. The method further includes, when an end time of the one of the reservations is reached, de-assigning the one of the reservations from the VLAN and dynamically configuring the network component to thereby cause the network component to stop placing network traffic associated with the one or more user devices on the VLAN.

These and other advantages and embodiments of the present invention will no doubt become apparent to those of ordinary skill in the art after reading the following detailed description of the preferred embodiment that is illustrated in the various figures and drawings.

BRIEF DESCRIPTION OF THE DRAWINGS

The invention will be described in greater detail with reference to the accompanying drawings which represent preferred embodiments thereof, wherein:

FIG. 2 illustrates a user interface (UI) screen allowing an event organizer or other authorized user to adjust a set of reservation-specific network settings for a particular event reservation according to an exemplary embodiment of the invention.

FIG. 5 illustrates an example of the location table of FIG. 1.

FIG. 7 illustrates an example of reservation-specific dynamic host control protocol (DHCP) server settings and gateway/firewall settings as configured by the system controller of FIG. 1 to share a printer during a particular reservation in which user devices are otherwise isolated.

FIG. 8 illustrates a UI screen allowing modification of information stored in a user profile database for an exemplary user according to an exemplary embodiment of the invention.

DETAILED DESCRIPTION

Figure 1:
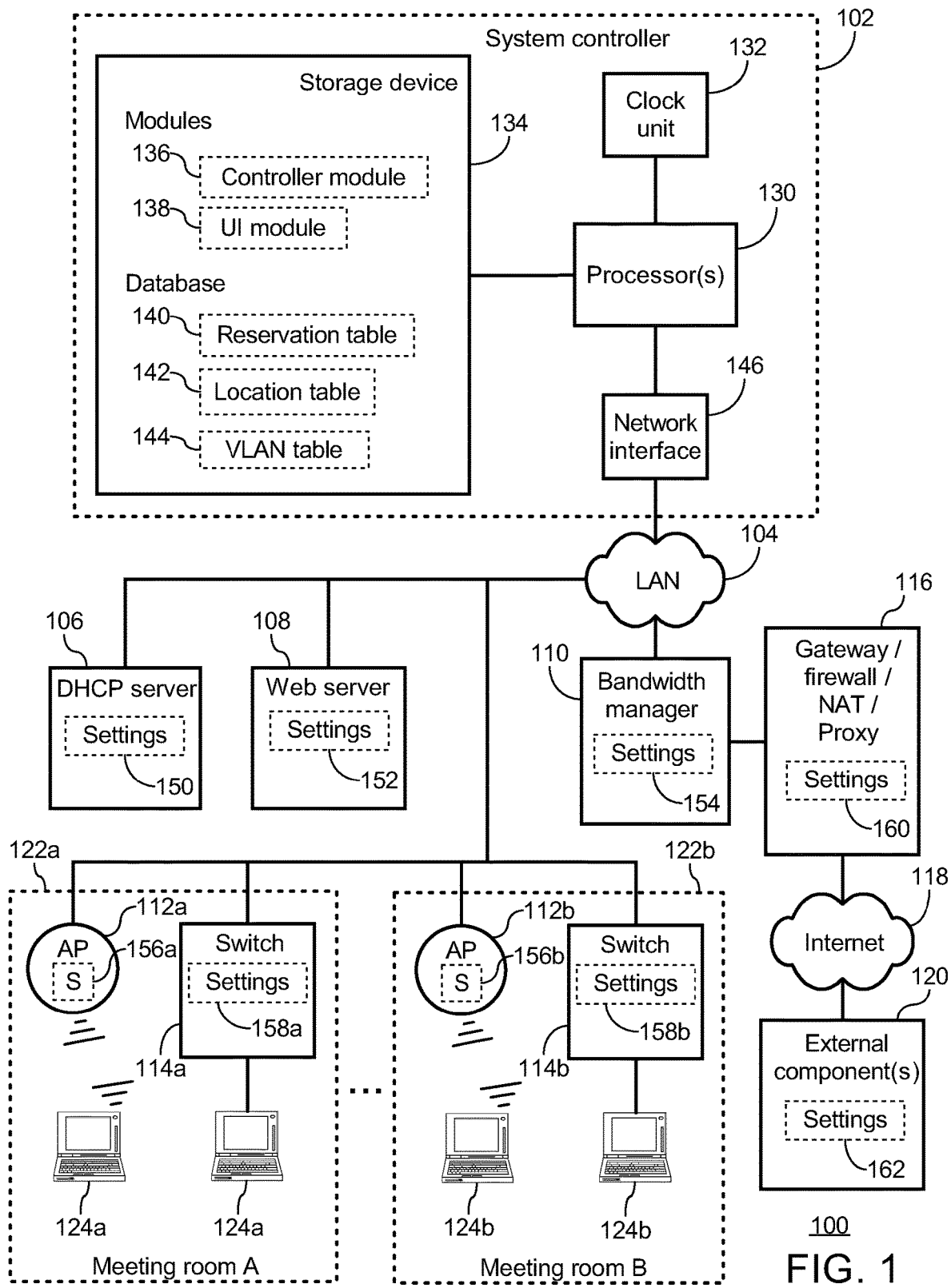
FIG. 1 illustrates a block diagram of a system for automatically configuring a computer network with reservation-specific network settings according to an exemplary embodiment of the invention.

FIG. 1 illustrates a block diagram of a system 100 for automatically configuring a computer network with reservation-specific network settings according to an exemplary embodiment of the invention. In this embodiment, the system 100 is employed at a hospitality establishment such as a hotel or resort in order to customize a computer network providing high speed Internet access (HSIA) at the hospitality establishment with reservation-specific settings of different events hosted thereat. As illustrated in FIG. 1, a system controller 102 is coupled to a number of network components via the computer networking shown as a local area network (LAN) 104 at the hospitality establishment in this example. Network components of the computer network in this example include a dynamic network configuration protocol (DHCP) server 106, a web server 108, a bandwidth manager 110, a plurality of wireless access points (APs) 112, a plurality of switches 114, and a gateway/firewall 116 coupled to the Internet 118.

For purposes of illustration, in the following description the hospitality establishment is assumed to be a hotel having a number of available locations 122 for hosting events, for example, a first meeting room 122a and a second meeting room 122b. Although only two meeting rooms are shown in this example, any number and type of locations for hosting events may be included in other embodiments. User devices 124 are brought to the hotel by guests attending events hosted in the meeting rooms 122; user devices 124 may be coupled to the hotel's computer network using either wired technology such as Ethernet ports via switches 114 or wireless technology such as Wi-Fi™ access via APs 112. Examples of user devices 124 include desktop/laptop/netbook/tablet computers, mobile phones, printers, fileservers, routers, access points, web cams, virtual private network (VPN) appliances, teleconferencing equipment, gaming consoles, etc.

The system controller 102 in this example is a computer server including one or more processors 130 coupled to a clock unit 132 and a storage device 134. The storage device 134 stores a number of software modules including a controller module 136 and a user interface (UI) module 138 for execution by the one or more processors 130. The storage device 134 further stores a database having a reservation table 140, a location table 142, and a VLAN table 144. In this embodiment a relational database is utilized to store the tables 140, 142, 144; however, the term "database" as utilized in this description is meant to refer to any stored collection of organized data, and the term "table" is meant to refer to any subset of the data.

In the following description the plural form of the word "processors" will be utilized as it is common for a CPU of a computer server to have multiple processors 130 (sometimes also referred to as cores); however, it is to be understood that a single processor 130 may also be configured to perform the described functionality in other implementations.

The system controller 102 further includes a network interface 146 coupled to the LAN 104, which allows the processors 130 to communicate with network components via the LAN 104. Network components on the local area network (LAN) 104 may include devices that provide connectivity on the LAN 103 such as the APs 112 and the switches 114, provide services on the LAN 104 such as the DHCP server 106 and the web server 108, or provide access control on the LAN 104 such as the bandwidth manager 110 and the gateway/firewall 116. As shown in FIG. 1, there may also be additional network components off the LAN 103 such as shown in FIG. 1 by the one or more external network component(s) 120 coupled to the Internet 118. Examples of external network components 120 include offsite controllers, offsite web servers, central storage locations, user profile servers, etc.

Network components may also be integrated together within a single unit. For example, in another embodiment, one or more of the network components such as DHCP server 106, web server 108, bandwidth manager 110, and gateway/firewall 116 are included as additional software modules (not shown) within storage device 134 for execution by the processors 130, while the APs 112, the switches 114, and the external components 120 are external to the system controller 102.

Each network component includes configurable settings that control certain functions of the network component. For example, the DHCP server 106 includes one or more configurable settings 150, the web server 108 includes one or more configurable settings 152, the bandwidth manager includes one or more configurable settings 154, the APs 122a,b respectively include one or more configurable settings 156a,b, the switches 114a,b respectively include one or more configurable settings 158a,b, the gateway/firewall 116 includes one or more configurable settings 160, and the external component(s) each include configurable settings 162. In a preferred embodiment, the network components store the configurable settings 150, 152, 154, 156, 158, 160, 162 at the network component in a non-volatile memory or storage device so that the component will continue to maintain the same configuration even in the event of a power failure or restart.

The gateway/firewall 116 couples the LAN 104 to the Internet 118 and acts to control the flow of data between these two networks 104, 118. As shown, the gateway/firewall 116 may also include other functionality such as network address translation (NAT), redirection server, and/or proxy server functionality; or the gateway/firewall 116 may be replaced with or installed in addition to one or more servers implementing these functions as required according to application-specific requirements. In the following description, the terms "gateway" and "firewall" will be utilized to collectively refer to devices that perform access control between different networks.

The clock unit 132 is a real-time clock chip installed in the system controller 102 that tracks the current time and is kept synchronized with the rest of the world by the processors 130 according to one or more time servers located on the Internet 118. By executing the controller module 136, the processors 130 are configured to periodically check whether the start time of any of the pending reservations in the reservation table 140 has been reached. Pending reservations in this example refers to reservations stored in the reservation table 140 that have not yet been determined by the processors 130 to have reached their start times. The processors 130 may search the reservation table 140 for pending reservations having a start time prior to the current time as tracked by the clock unit 132. It is to be understood that the term "time" in this description may include the date such when a meeting at the hotel is scheduled to start and end at particular date/time combinations.

When the start time of a particular reservation is reached, the processors 130 automatically send configuration commands to one or more network components via the network interface 146 in order to activate a set of reservation-specific network settings for the particular reservation as stored in the reservation table 140. Thereafter, the processors 130 continue to monitor the current time as tracked by the clock unit 132, and, when the end time of the particular reservation is reached, the processors 130 automatically send configuration commands to one or more network components via the network interface 146 in order to deactivate the set of reservation-specific network settings for the now ending reservation.

In this embodiment, the reservation table 140 stores details of a plurality of events that are to be held at the hotel. Examples of events include conferences, meetings, exhibitions, parties, reunions, ceremonies, etc. Each event reservation has a designated start time, end time, and one or more reservation-specific network settings.

FIG. 2 illustrates a UI screen 200 allowing an event organizer to adjust a set of reservation-specific network settings for a particular event reservation as stored in the reservation table 140 of FIG. 1. The UI screen 200 is a web page screen generated by the processors 130 executing the UI module 138. The UI module 138 further configures the processors 130 to send hypertext markup language (HTML) for the UI screen 200 to an authorized destination via the network interface 146. The system controller 102 may thereby behave as a web server allowing event organizers, hotel staff, or other users to make event reservations and configure different sets of reservation-specific network settings for each event.

According to user selections and input made on the UI screen 200 for a particular reservation, the processors 130 store the specified set of reservation-specific network settings in the reservation table 140. UI screen 200 enables an event organizer or other user to utilize a web-browser to initially setup a particular reservation and to update the reservation's settings both before the event has started and while it is in progress. An event organizer may utilize a web-enabled device connected to the hotel's LAN 104 such as one of user devices 124 to access UI screen 200, which may be beneficial when making changes to an ongoing event. Alternatively, the event organizer may utilize a web-enabled device remote to the hotel such as via the Internet 118, which may be beneficial when setting up an event reservation prior to arrival.

The UI module 138 may further configure the processors 130 to perform user authentication to ensure that the UI screen 200 for a particular reservation is only shown to authorized users associated with the reservation. In some embodiments, hotel staff may be permitted to access the UI screen 200 for all reservations stored in the reservation table 140.

In the example shown in FIG. 2, the UI screen 200 allows the event organizer (or another authorized user) to configure a number of general settings that affect the event as a whole, and a number of device-specific settings that only affect one or more specifically identified registered user devices that will be coupled to the hotel's computer network by an event attendee during the event.

A reservation identifier (ID) 202 is unique to the reservation. The reservation ID 202 may be automatically generated by the system controller 102 upon the creation of the event reservation.

A description 204 is input by the event organizer to identify the purpose of the event.

Start time and end time fields 206, 208 are adjustable by the event organizer as long as the adjustments do not conflict with other event reservations in the reservation table 140.

A location(s) setting 210 allows the event organizer to specify specific locations within the hotel at which the event is to be held. As shown in FIG. 2, a single event may be concurrently held at several different locations; however, in a preferred embodiment, the system controller 102 checks for event conflicts to prevent multiple events from being held at a same location during a same time period. The processors 130 may display an error message on UI screen 200 notifying the user of time and/or location conflicts with other event reservations.

The service set identifier (SSID) setting 212 allows the event organizer to specify a text string for the SSID that will be broadcast by wireless APs 112 within range of the event location(s). Guests attending the event may associate their wireless devices to the specified SSID in order to gain HSIA during the event.

The require login setting 214 allows the event organizer to require that users log in before being permitted access to the Internet during the event. However, even when the require login setting 214 is set to "yes", as described further below with reference to the registered device settings, the UI screen 200 in this exemplary embodiment also allows the event organizer to register a specific user device 124 for automatic log in so that the registered user device will receive HSIA without being required to log in.

The login portal setting 216 species the uniform resource locator (URL) of the login portal to which new users will be redirected or otherwise caused to view when the require login setting 214 is set to "yes".

The meeting passcode 218 allows the event organizer to specify the required meeting passcode for the particular reservation that users will be required to enter at the login portal in order to gain HSIA during the event.

The walled garden site(s) setting 220 allows the event organizer to list URLs for web sites on the Internet 118 that are to be made accessible through the gateway/firewall 116 before a user has logged in at the login page 216. These walled garden web sites will be available to non-logged in users during the event.

The bandwidth limits settings 222 allow the event organizer to specify bandwidth limits such as maximum aggregate bandwidth utilization (Cap) that will be provided to the event as a whole and a guaranteed minimum rate (Rate) that will be provided to the event even when the computer network at the hospitality establishment is experiencing high utilization.

The user isolation setting 224 allows the event organizer to specify whether user devices 124 logged in to a particular meeting are to be isolated from other user devices 124 logged in to the same meeting.

The required number of public IP(s) setting 226 allows the event organizer to reserve a required number of the hotel's public IP addresses for use during the event.

The registered device settings allow the event organizer to register any number of specific user devices (e.g. one registered user device per row in UI screen 200) and to specify a number of registered device setting(s) for each registered user device (different device-specific network settings shown in columns in UI screen 200). Whereas the above-described general settings in this example affect the behavior of the computer network at the hotel during the event toward user devices 124 in general, the registered device settings affect the behavior of the computer network at the hotel during the event toward registered user devices identified by specified device identifiers (e.g., MAC addresses in column 228).

In this example, the device name setting 228 provides a human-readable description to identify the registered user device.

The device identifier (ID) setting 230 allows the event organizer to input the unique MAC address of the registered user device. In some embodiments, different types of device identifiers other than MAC addresses may also be utilized to identify registered user devices, for example, subscriber identifier module (SIM) card numbers, Internet protocol (IP) addresses, hardware or software serial numbers, etc.

The auto login setting 232 allows the event organizer to specify that the registered user device should be automatically logged in without requiring the device to be redirected to the login page. When the checkbox in column 232 is checked, the registered user device will be automatically cleared through the firewall for the duration of the particular reservation even when the require login setting 214 for the event has been set to "yes".

The user shared setting 234 allows the event organizer to specify that the registered user device should be made accessible to other user devices 124 that are logged in to the event. When the checkbox in column 234 is checked, the device will be shared during the event even when the user isolation setting 224 for the event is set to "yes".

The device-specific bandwidth limits settings 236 allow the event organizer to allocate a specific bandwidth cap and/or rate to the registered user device.

The public IP column 238 allows the event organizer to select a particular public IP available at the hospitality establishment to be assigned to the registered user device when it is connected to the hotel's computer network during the event. Being able specify the public IP address in advance is useful to allow event organizers to setup external equipment to use this public IP during the event, and to make remote attendees aware of the pubic IP that will be utilized during the event so they can remotely connect to that public IP. For example, the event organizer of the particular reservation illustrated in FIG. 2 may send out an instruction email telling remote attendees to connect to the web cam 242 during the event at the public IP address of "69.46.103.131". In some embodiments, the system controller 102 automatically assigns a free public IP address to the registered user device at the start time of the reservation rather than allowing the user to select the exact public IP in column 238.

As shown in this example, two user devices 124 are registered for the event including a printer 240 that is to be shared with the other user devices 124 participating in the event, and a teleconferencing web cam 242 that is to be automatically logged in to the event, cleared through the gateway/firewall 116, assigned a specific public IP address, and provided a 5 Mbit/s bandwidth cap and rate to ensure sufficient video quality during the event. The event organizer may click the "Add new device" button to add another device and there may also be buttons on UI screen 200 (not shown) to allow the event organizer to delete registered user devices 240,242 that have already been configured.

Figure 3:
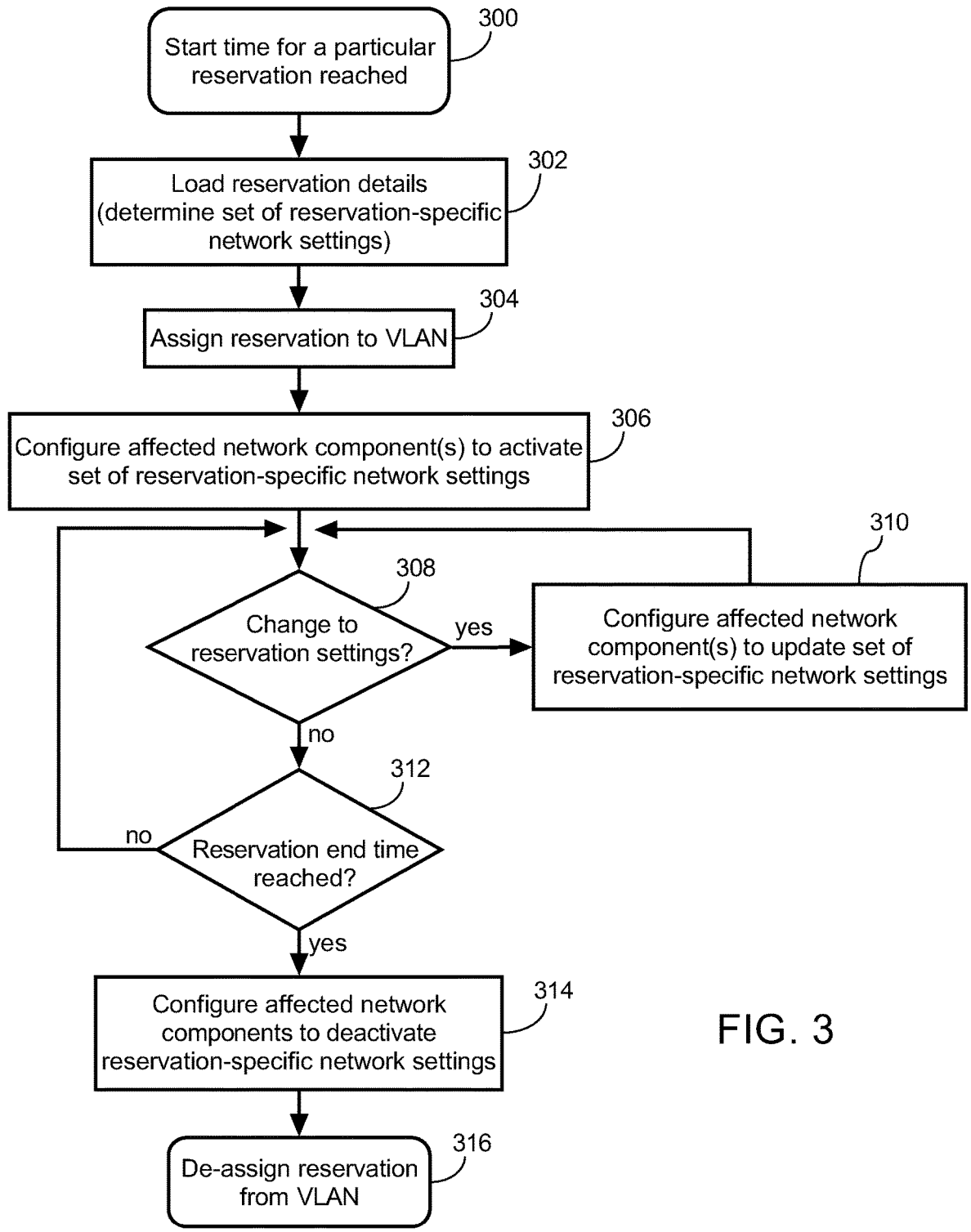
FIG. 3 illustrates a flowchart describing a method of configuring a computer network with reservation-specific network settings according to an exemplary embodiment of the invention.

FIG. 3 illustrates a flowchart describing a method of configuring a computer network with reservation-specific network settings according to an exemplary embodiment of the invention. In this embodiment, the flowchart represents an algorithm performed by the processors 130 of the system controller 102 as specified by instructions of the controller module 136. The steps of the flowchart are not restricted to the exact order shown, and, in other embodiments, shown steps may be omitted or other intermediate steps added.

At step 300, the system controller 102 monitors the value of the current time as tracked by the clock unit 132 in order to detect when the start time 206 of a particular reservation is reached. For example, as shown in FIG. 2, each of the different events to be held at the hospitality location as stored in the reservation table 140 has a defined start time setting 206. Step 300 may be performed by the processors 130 of the system controller 102 executing the controller module 136 in order to search the reservation table 140 in the storage device 134 and determine that the start time 206 for a particular pending reservation has been reached. In the remaining description, it will be assumed that a single reservation is determined to be starting at this step; however, more than one pending reservation may start at the same time, which causes the system controller 102 to perform the below steps for each of the particular reservations found to have reached their start times 206.

At step 302, the system controller 102 loads the set of reservation-specific network settings for the particular reservation found to be starting at step 300. This step may be performed by the processors 130 loading the set of reservation-specific network settings for the reservation from the reservation table 14 stored in the storage device 134. This initial set of reservation-specific network settings for the particular reservation was previously entered on UI screen 200 by an organizer while setting up the event reservation.

At step 304, the system controller 102 changes the state of the particular reservation in the reservation table 140 from pending to current and assigns the reservation ID 202 for the particular reservation as specified in the reservation table 140 to a free virtual local area network (VLAN) of the hotel's computer network. Current reservations correspond to ongoing (i.e., active) events at the hotel for which the start time has been reached but the end time has not yet been reached. In this embodiment, each current reservation at the hotel is assigned to its own VLAN in order to both secure the network traffic of the event by limiting network traffic from each event to its own VLAN (i.e., prevent network usage of one event from interfering with another event) and to facilitate configuring different reservation-specific network settings for each current event.

Figure 4:
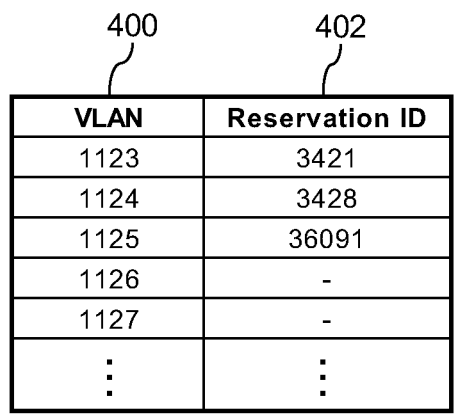
FIG. 4 illustrates an example of the virtual local area network (VLAN) table of FIG. 1.

FIG. 4 illustrates an example of the VLAN table 144 of FIG. 1. In this embodiment of the invention, the hotel's computer network has a plurality of predetermined VLANs that are used to isolate network traffic of different reservations. In this embodiment, the number of predetermined VLANs corresponds to a maximum number of concurrent events that may held at the hotel at a single time. As event reservations start, they are respectively assigned to free VLANs; as event reservations end, the corresponding VLANs are marked as free again.

As shown in FIG. 4, the VLAN table in this example includes a VLAN table column 400 listing each of the predetermined VLANs on the computer network that may be associated with a current reservation. The reservation ID column 402 species the reservation ID of the particular reservation (if any) currently associated with the VLAN. The value of the reservation ID in column 402 corresponds to the reservation ID setting 202 as shown in FIG. 2. Free VLANs for which no reservation ID is currently associated are indicated with a "-" in the reservation ID column 402 of FIG. 4. When a particular reservation starts, the system controller 102 associates the reservation ID of the newly starting reservation with a free VLAN, and, when the particular reservation ends, the system controller 102 removes the association of the reservation ID with that VLAN. In this way, VLAN table 144 indicates the VLAN associated with each of the current reservations at the hotel.

Continuing the description of FIG. 3, at step 306, the system controller 102 configures one or more affected network component(s) 106, 108, 110, 112, 114, 116, 120 in order to activate the set of reservation-specific network settings loaded at step 302. Configuring a network component may involve sending simple network management protocol (SNMP) messages (e.g., using SNMPv3 as defined by RFC3411-RFC3418, which are incorporated herein by reference) from the system controller 102 to the network component via the LAN 104 and/or the Internet 118. Rather than configuring a network component using SNMP, the system controller 102 may instead apply configuration settings using a web interface of the network component. In yet another example, the system controller 102 may access and configure a particular network component by utilizing secure shell (SSH) or telnet in order to access a command line interface (CLI) of the network component. When a CLI is available on a network component, configuration using the CLI is preferred over traditional SNMP as supported CLI commands have been found to change less frequently than SNMP commands when firmware updates are applied. In general, any remote configuration technique may be utilized by the system controller 102 to access and configure the network component(s).

Further details of how the system controller 102 may determine and configure the affected network component(s) of the hotel computer network illustrated in FIG. 1 to activate the set of reservation-specific network settings for the particular reservation illustrated in UI screen 200 of FIG. 2 are provided later in this description with reference to FIG. 5 and FIG. 6.

At step 308, the system controller 102 monitors for changes to the set of reservation-specific network settings for the particular reservation as stored in the reservation table 140. Changes to a current event while it is in progress may occur when the event organizer (or another authorized user) accesses UI screen 200 in order to update settings for the event. For example, the event organizer may wish to upgrade one of the bandwidth limit settings 222 if attendees at an event complain that Internet access is too slow. In another example, the event organizer may wish to automatically log in a specific user device 124 by entering the device's MAC address in column 230 and checking the checkbox to activate automatic login 232. In a preferred embodiment, any of the user-configurable settings shown on UI screen 200 may be updated during the event. The processors 130 may periodically check for changes of the reservation-specific network settings in the reservation table 140. When the settings of the current reservation are found to have been changed, control proceeds to step 308; otherwise, control proceeds to step 310.

At step 310, the system controller 102 configures one or more of the network components 106, 108, 110, 112, 114, 116, 120 in order to update the set of reservation-specific network settings of the particular reservation according to the changes detected at step 308. Similar to step 306, this step may involve the system controller 102 remotely configuring an affected network component via the LAN 116 and/or the Internet 118 to deactivate the previously configured reservation-specific network setting and to activate an updated reservation-specific network setting. In this way, any of the reservation-specific network settings shown in UI screen 200 may be updated while the particular reservation is ongoing (i.e., after the start time of the reservation has been reached and before the end time of the reservation is reached).

At step 312, the system controller 102 determines whether the end time 208 of the particular reservation has been reached. This step may be performed by the processors 130 monitoring the current time as tracked by the clock unit 132 to determine whether the current time has passed the end time 208 of the particular reservation as specified in the reservation table 140. When the end time 208 of the particular reservation has been reached, control proceeds to step 312; otherwise, control returns to step 308.

At step 314, because the end time 208 of the reservation has been reached, the system controller configures one or more network components of the hotel's computer network in order to deactivate the reservation-specific network settings for the now ending reservation. In one embodiment, this step may involve putting the affected network components back to a default configuration state. In another embodiment, this step may involve configuring network components to change their settings to activate the set of reservation-specific network settings for a next event that is to be held at the hotel.

At step 316, the system controller 102 de-assigns the reservation ID for the now completed reservation from the VLAN table 144. In this way, the VLAN that was assigned to the reservation ID of the completed reservation is now freed and may be utilized for a subsequent reservation.

FIG. 5 illustrates an example of the location table 142 of FIG. 1. The location table 142 stores associations between network components and locations (e.g., meeting rooms in the hotel) and is utilized by the system controller 102 to determine one or more affected network components according to the location(s) setting 210 of a particular reservation. In this example, the location table 142 includes a location column 500 specifying a location identifier. Human readable descriptions are utilized in this example for ease of illustration; however, the location identifier may be implemented using other types of unique values for each location.

The component type column 502 indicates the type of the network component being an AP 112 or switch 114 in this example. Although only APs and switches are specifically associated with particular locations in this example, other types of network components other than or in addition to APs and switches may be associated with specific locations and stored in the location table 142 in other embodiments.

The IP address column 504 indicates the IP address of the network component. The port number column 506 is only applicable to the switches 114 and indicates a specific port that is accessible from the location in column 500.

As shown in FIG. 5, a single switch 114 may have ports associated with a first location and other ports associated with one or more other locations. Additionally, a single AP 112 may be within range of multiple locations and therefore be associated with multiple locations in the location table 142. The location table 142 may be defined when the computer network is installed at the hotel and may be updated when changes to installed network components are made such as when new APs 112 or switches 114 are added to the hotel.

Figure 6:
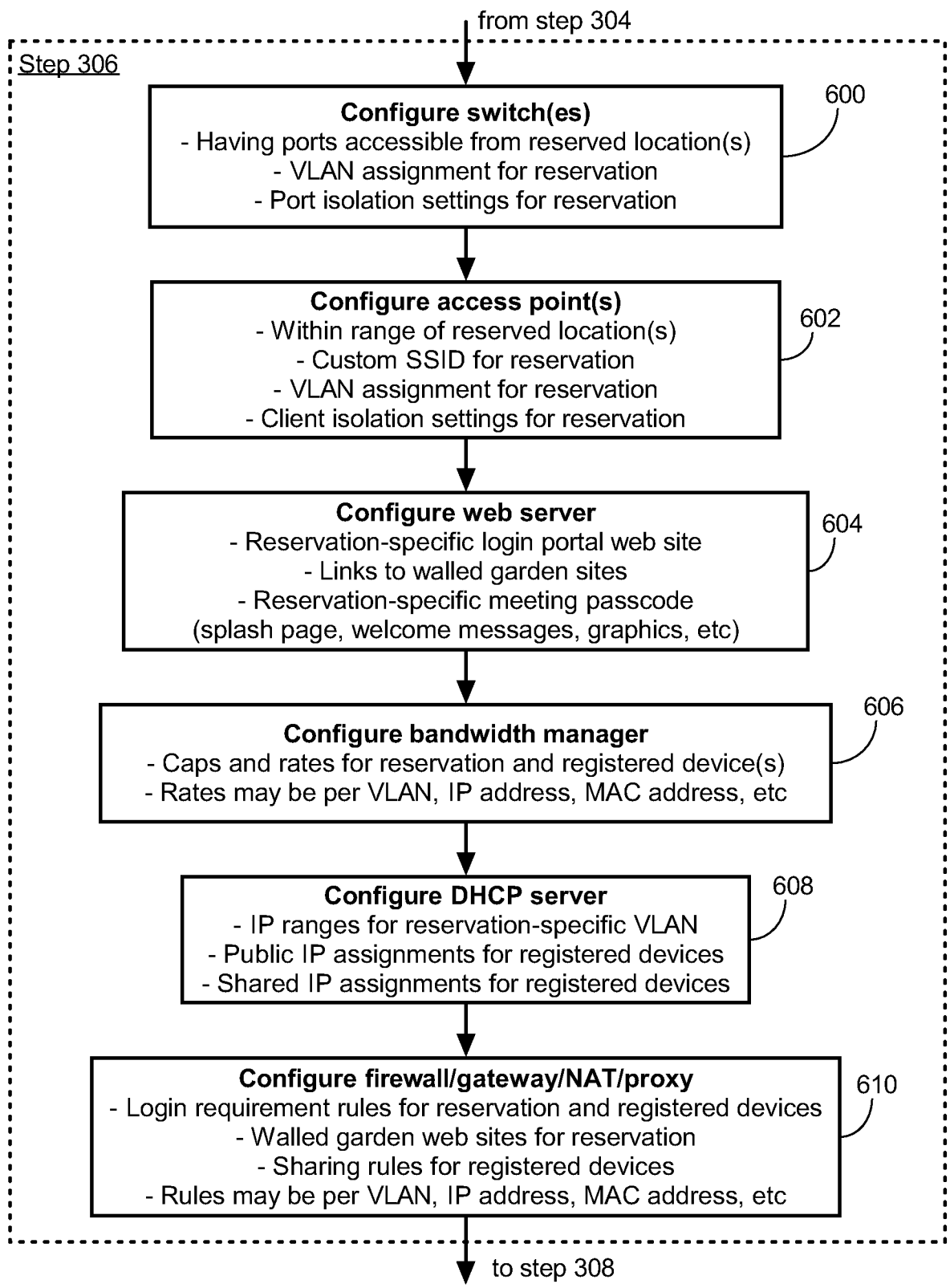
FIG. 6 illustrates example sub-steps for determining and configuring affected network components in order to activate the set of reservation-specific network settings illustrated in the UI screen of FIG. 2.

FIG. 6 illustrates example sub-steps for determining and configuring affected network components in order to activate the set of reservation-specific network settings of the particular reservation illustrated in the UI screen 200 of FIG. 2. In this embodiment, step 306 of FIG. 3 is implemented by the processors 130 performing the sub-steps of FIG. 6. Similar to the flowchart of FIG. 3, the sub-steps shown in FIG. 6 are not restricted to the exact order shown, and, in other embodiments, shown sub-steps may be omitted or other intermediate sub-steps added.

At sub-step 600, the system controller 102 configures the switches 114 to activate the reservation-specific network settings related to the location(s) setting 210 and the user isolation setting 224 shown in FIG. 2. This sub-step involves the processors 130 first determining which of the switches 114 have ports accessible from the location(s) associated with the reservation. As illustrated in FIG. 2, the location(s) setting 210 specifies the event is held at "Meeting room A", "Meeting room B", and "Meeting room C" in this example. The processors 130 may thereby search the location table 142 to select the affected switches 114 as the switches 114 having ports accessible from any of these locations.

After determining the one or more affected switches 114, the processors 130 in this example send SNMP commands to the IP addresses of these switches 114 via LAN 104 to configure the switches 114 so that the ports accessible from the event place network traffic on the VLAN associated with the event. As shown in FIG. 2, the reservation ID 202 for this example event is "3421"; therefore, the ports are locked to VLAN "1123" as this is the VLAN associated with the reservation ID in the VLAN table 144 illustrated in FIG. 4. The processors 130 further send SNMP commands to the affected switches 114 to isolate the event-accessible ports from one another because the user isolation setting 224 for the event is set to "yes" in FIG. 2. Rather than port isolation settings, access control lists (ACLs) on the switches 114 may instead be remotely configured by the system controller 102 to achieve a similar result. The switches 114 may store their new configuration settings 158 in a non-volatile memory so that once they have been configured in this sub-step, they remain thus configured until either step 310 or step 314 of FIG. 3 is reached.

At sub-step 602, the system controller 102 configures the APs 112 to active the reservation-specific network settings related to the location(s) setting 210, the SSID setting 212, and the user isolation setting 224. This sub-step involves the processors 130 first determining the one or more affected APs 112 that are within range of the event. According to the location(s) setting 210 of the particular reservation, the processors 130 search the location table 142 to select the APs 112 within range of "Meeting room A", "Meeting room B", and "Meeting room C" as the affected APs 112. The processors 130 then send SNMP commands to the IP addresses of these APs 112 via LAN 104 to configure the affected APs 112 so that they broadcast a custom SSID for the event as specified in the SSID setting 212. The processors 130 further send SNMP commands via the LAN 104 to configure the APs 112 to place network traffic of a user devices 124 associated with the custom SSID on the VLAN of the reservation as specified in the VLAN table 144, i.e., "1123" in this example as determined at sub-step 600. Finally, the processors 130 further send SNMP commands via the LAN 104 to configure the APs 112 to isolate client devices associated with the custom SSID because the user isolation setting 224 for the event is set to "yes" in FIG. 2. The APs 112 may store their new configuration settings 156 in a non-volatile memory so that once they have been configured in this sub-step, they remain thus configured until either step 310 or step 314 of FIG. 3 is reached.

At sub-step 604, the system controller 102 configures the web server 108 to activate the reservation-specific network settings of the particular reservation related to the login portal setting 216, the meeting passcode setting 218, and the walled garden sites 220. This sub-step involves the processors 130 sending SNMP commands to the web server 108 via the LAN 104 to activate the login portal at the URL specified in the login portal setting 216. The processors 130 further send SNMP commands to the web server 108 so that the login portal is configured to accept the event's passcode as specified in the meeting passcode setting 218. Additionally, the processors 130 further send SNMP commands to the web server 108 to add links to the walled garden sites 220 to the HTML content of the login page so that users are aware they may browse the walled garden sites 220 without needing to log in to the event. Other aspects of the login portal may also be configured by the processors 130 in a similar way such as reservation-specific splash pages, welcome messages, graphics, etc. The web server 108 may store its new configuration settings 152 in a non-volatile memory so that once it has been configured in this sub-step, it remains thus configured until either step 310 or step 314 of FIG. 3 is reached.

In this embodiment, when a user logs in at the login portal provided by the web server 108 from a user device 124, the web server 108 sends a message to the system controller 102 to dynamically add a device-specific exception to the gateway/firewall 116 allowing HSIA for that user device 124 for the remaining duration of the event. Alternatively, the web server 108 may directly add the device-specific exception to the gateway/firewall 116.

At sub-step 606, the system controller 102 configures the bandwidth manager 110 to activate the reservation-specific network settings of the particular reservation related to the general bandwidth cap and rate limits 222 and any registered user device caps and rates 236. This sub-step involves the processors 130 sending SNMP commands to the bandwidth manager 110 via the LAN 104 to activate the general bandwidth cap and rate 222 for all traffic on the VLAN associated with the event. As previously described, the VLAN associated with the event may be looked up in the VLAN table 144 according to the reservation ID 202. The processors 130 further send SNMP commands to the bandwidth manager 110 to activate any device-specific rates and caps as specified for registered user devices during the event. Device-specific rates and caps may be applied to traffic having a source or destination matching the device identifier (ID) setting 230 of the registered user device on the VLAN associated with the event. To ensure that the registered user device receives its device-specific cap and rate during the event, device specific bandwidth limits may be applied with a higher priority than the general bandwidth limits 222 for the event as a whole. For instance, in this example, the teleconferencing web cam 242 is registered with a device-specific cap and rate of 5 Mbit/s, which would be taken from the 30 Mbit/s cap and 10 Mbit/s rate of the event as whole. The bandwidth manager 110 may store its new configuration settings 154 in a non-volatile memory so that once it has been configured in this sub-step, it remains thus configured until either step 310 or step 314 of FIG. 3 is reached.

At sub-step 608, the system controller 102 configures the DHCP server 106 to activate the reservation-specific network settings of the particular reservation related to public IP assignments 238 and sharing 234 of registered user devices. This sub-step involves the processors 130 sending SNMP commands to the DHCP server 106 via the LAN 104 to activate IP address assignment for the MAC address of a registered user device that needs a public IP during an event so that the registered user device is dynamically configured by the DHCP server 106 upon connection to the LAN 104 to receive the public IP address 238 specified in the registered device settings for the event. As will be explained in more detail below, the processors 130 further send SNMP commands to the DHCP server 106 to specify devices that are to be shared within an event so that the DHCP server 106 assigns the shared devices to a different range of IP addresses than devices that are to be isolated within the event. The DHCP server 106 may store its new configuration settings 150 in a non-volatile memory so that once it has been configured in this sub-step, it remains thus configured until either step 310 or step 314 of FIG. 3 is reached.

At sub-step 610, the system controller 102 configures the gateway/firewall 116 to activate the reservation-specific network settings of the particular reservation related to the require login setting 214, the login portal setting 216, the walled garden sites 220, the auto login setting 232 for registered user devices, and the user shared setting 242 for registered user devices. If the event does not require users to login, then the firewall may be configured at this sub-step to allow Internet 118 access for all user devices 124 on the event's VLAN. However, when the require login setting 214 is set to "yes", this sub-step involves the processors 130 sending SNMP commands to the gateway/firewall 116 to activate a default rule that blocks Internet 118 access for all user devices 124 on the VLAN of the event and redirects them to the specified login portal 216. Additionally, when there is at least one walled garden site 220, the processors 130 further send SNMP commands to the gateway/firewall 116 to add exceptions to the default rule that allow Internet 118 access when the source/destination address corresponds to one of the specified walled garden sites 220.

The processors 130 further send SNMP commands to the gateway/firewall 116 to add exceptions to the default rule that allow Internet 118 access for each registered user device that has the auto login setting 232 enabled. For example, the MAC address in column 230 of the teleconferencing web cam 232 is cleared through the gateway/firewall 116 at this time because it has been configured for auto login 232. In this way, the teleconferencing web cam 232 does not need to first log in at the event's login page 216 before gaining access to the Internet 118. The processors 130 further send SNMP commands to the gateway/firewall 116 to cause it to act as a gateway and pass traffic to and from registered user devices such as printer 240 that have the user shared setting 234 enabled. Further details of device sharing are provided below. The gateway/firewall 116 may store its new configuration settings 160 in a non-volatile memory so that once it has been configured in this sub-step, it remains thus configured until either step 310 or step 314 of FIG. 3 is reached.

Other sub-steps (not shown) may also be included such as the system controller 102 configuring one or more external network components 120 to activate reservation-specific network settings. For example, an external network component 120 may need to know the public IP address 238 of the teleconferencing web cam 242 in order to connect to the web cam 242 during the event. When the reservation starts, the processors 130 may send SNMP commands to one or more external network components 120 via the LAN 104 and the Internet 118 in order to notify these components of the public IP address of the web cam 242 during the event. Additionally, a similar sequence of sub-steps may be performed to activate a change in one or more of the reservation-specific network settings during an event (at step 310 of FIG. 3) and when the reservation-specific network settings are deactivated when the reservation end time is reached (at step 314 of FIG. 3).

Also, as previously mentioned, other types of remote configuration besides or in addition to SNMP commands such as SSH access to a CLI on the network component to be configured may be employed by the system controller 102.

FIG. 7 illustrates an example of reservation-specific DHCP server settings 150 and gateway/firewall settings 160 as configured by the system controller 102 to share the printer 240 during a particular reservation for which user devices are otherwise isolated. During an event, user devices 124 may be isolated from each other as a result of event organizer setting the user isolation setting 224 to "yes" on the UI screen of FIG. 2. User isolation is particularly useful during events such a conferences and meetings where attendees are not known to each other or do not trust other attendees. For example, user isolation beneficially prevents attendees from being able to find and access inadvertently shared folders on other attendees' computers 124. However, while wishing to generally isolate user devices 124 for the protection of attendees, the event organizers or one of the attendees may also wish to bring a certain user device 124 such as a printer or file server to the event and to allow this device to be shared during the event.

Taking the printer 240 of FIG. 2 as an example, the event organizers may specify the printer's MAC address in column 230 in the registered device settings of the event reservation (either in advance of the event or after the event has begun). According to these reservation-specific network settings, the system controller 102 automatically configures the DHCP server 106 to update its configuration settings 150 to associate the printer's MAC address (in column 230) with a particular IP address being in a different range (e.g., a different IP subnet) than the other non-shared user devices 124 on the same VLAN.

The top portion of FIG. 7 illustrates an example of reservation-specific DHCP server settings 150 as configured by the system controller 102 at sub-step 608. In order to activate the sharing settings for registered user device(s) of the particular reservation, the system controller 102 configures the DHCP server 106 with address assignment rules to be applied when receiving a DHCP request from a user device 124. As shown in the first row, when a received DHCP request is tagged with the VLAN tag of the particular reservation ("1123" in this example) and the source hardware address matches the MAC address of the printer 240, the DHCP server is configured to assign the user device 124 an IP address within a shared address range as specified in column 704. For example, the DHCP server 106 may assign the printer 240 with an address "192.168.1.1" in a DHCP acknowledgement message. The DHCP server 106 also assigns the printer 240 with a default gateway being the IP address of the gateway/firewall 116 and a subnet mask such as 255.255.255.0 in this example.

As shown in the second row, when a DHCP request is tagged with VLAN tag "1123" but the source hardware address is any other address (indicated by a "-" in column 702), the DHCP server 106 will assign this non-shared user device 124 an IP address within an isolated address range as specified in column 704.

Because the DHCP server 106 is configured with these reservation-specific network settings 150, the printer 240 will receive an IP address being within the shared address range. If more than one device is to be shared within the event, the DHCP server may easily be configured to assign each of the user devices 124 to be shared with an IP addresses in the shared address range as well.

The bottom portion of FIG. 7 illustrates an example of reservation-specific gateway/firewall 116 settings 160 configured by the system controller 102 at sub-step 610. As described above, each event may have two ranges of IP addresses for assignment by the DHCP server 106, specifically, a shared address range and an isolated address range. In order to allow any of user devices 124 that are assigned IP addresses in the isolated address range to communicate with devices in the shared address range such as the printer 240 in the above example, the system controller 102 configures the gateway/firewall 116 with three reservation-specific rules shown as three rows in the gateway/firewall settings 160 of FIG. 7.

The first rule allows the transfer of any packets having a source address in the shared address range on the event's VLAN. For example, this rule allows the printer 240 to advertise its existence on the LAN 104 to non-shared user devices 124 in the isolated range such as by using broadcast IP packets. Well-known protocols such as the Service Location Protocol (SLP) may thereby be utilized by the printer 240.

The second rule causes the gateway/firewall 116 to pass any packet having a destination IP address in the shared address range. This rule allows all user devices 124 participating in the particular reservation (i.e., on the event's VLAN) to send packets to the printer 240 such as when connecting to the printer and printing documents over the LAN 104.

The third rule causes the gateway/firewall 116 to drop all packets that have both a source and destination within the isolated address range. This rule ensures isolation of user devices 124 that are not shared during the event. Typically, these packets will already be blocked at the AP 112 or switch 114 level as a result of activating the user isolation setting 224 at sub-steps 600 and 602; however, the third rule is added to the gateway/firewall 116 to further ensure that these packets will also be dropped at the gateway/firewall 116 if they somehow make it that far.

As shown, the system controller 102 automatically configures the gateway/firewall 116 to allow network traffic to and from devices in the shared address range but block network traffic between devices in the isolated address range. As a result of the reservation-specific network settings, only devices that have been specifically registered for the event and have the user shared setting 234 enabled will be assigned an address in the shared address range.

When the printer 240 is connected to the LAN during the event, it sends a DHCP request on the LAN 104. The printer's MAC address in the DHCP request matches the first rule in the reservation-specific DHCP settings 150; therefore, the DHCP server 106 assigns the printer 240 a specific IP address (e.g., 192.168.1.1) within the shared address range. When other user devices 124 are connected to the LAN 104, they also send DHCP requests. However, their MAC addresses do not match the first rule so the second rule applies and they are assigned unique addresses in the isolated address range (e.g., 192.168.0.0 to 192.168.0.254 in this example).

When a user device 124 such as an attendee's laptop computer tries to send a packet to another address within the isolated address range (e.g., to an address on the same subnet as determined by the netmask setting of the user device 124, for example, 192.168.0.11), the user device 124 will send the packet directly. Since the APs 112 and the switches 114 were are all configured at sub-steps 600 and 602 to drop direct port-to-port and client-to-client network traffic, communication is impossible. In the event the packet makes it up to the gateway/firewall 116, it will also be dropped as a result of the third rule in the gateway/firewall settings 160 described above for FIG. 7.

However, when the user's laptop tries to send a packet to the printer 240, because the printer's IP address (192.168.1.1) is in a different range (e.g., on a different subnet as determined by the netmask setting of the user device 124), the user device 124 will send the packet to the default gateway, which causes the packet to be passed from the switch 114/AP 112 to the gateway/firewall 116. The reservation-specific gateway/firewall rules 160 then cause the gateway/firewall 116 to pass the packet back down to the appropriate AP 112/switch 114 for delivery to the printer 240. Irrespective of the switch port or AP to which the printer 240 is connected, because the packet is now coming from the gateway/firewall 116 on a different physical port of a switch 114 or from the network side of the AP 112, the packet is not blocked at the switch 114 or the AP 112 and communication is successful. Packets from the printer 240 to any of the user devices 124 and broadcast traffic between the printer and the user devices on the same VLAN work in a similar way. The result is user devices 124 may automatically discover the shared printer 240 without manual configuration and may communicate with the printer 240 during the event, but the user devices 124 are otherwise isolated from each other so user device 124 security is maintained during the event.

The DHCP server 106 may be dynamically configured by the system controller 102 to assign any number of user devices IP addresses in either the shared or isolated address ranges. The switches 114, APs 112, and gateway/firewall 116 may be dynamically configured by the system controller to allow traffic between a device in the shared address range and another device in the isolated address range, while blocking traffic between devices that are both in the isolated address range. These configurations are dynamically triggered when the event starts and are automatically removed when the event ends.

The shared and isolated address ranges may be predetermined for each VLAN or be dynamically created by the system controller 102. For example, each event VLAN may have a first range of predetermined addresses forming the shared address range and a second range of predetermined addresses forming the isolated address range. Alternatively, all user device addresses on the event VLAN may initially be assumed to be within the isolated address range, and the shared address range on a particular reservation VLAN may be dynamically created for each registered device having the user shared setting 234 on UI screen 200 enabled. With reference to the printer 240 of FIG. 2, the shared address range may in fact consist of a single IP address because the reservation-specific network settings for this event only specify a single device (e.g., the printer 240) is to be shared.

In an advantageous embodiment, user devices 124 may be registered in a reservation by conference organizers or other users to be automatically logged in to when the particular reservation starts. This allows devices that cannot log in at the web portal to still gain HSIA during the event. Users may specify a device identifier 230 for each registered user device and enable an auto login setting 232 using a web interface UI screen 200. When the reservation start time 206 is reached, the system controller 102 automatically logs in the registered user devices for the event and configures the gateway/firewall 116 to allow traffic between the Internet and each registered user device's MAC address. When the reservation end time 208 is reached, the system controller 102 automatically logs out the device and removes these cleared MAC address rule(s) from the gateway/firewall 116.

In this way, user devices 124 brought to the meeting that cannot be logged in at the hotel's login portal may be registered for the event and be automatically authorized Internet access during the event. Because event organizers may be authorized to directly register devices and configure auto login settings 232 on UI screen 200, the support costs of the system are reduced while the guest experience is enhanced. For example, in many cases the event organizers will be able to pre-register the specific devices for automatic login before the event starts. In this case, the system will "just work" and these user devices will be online immediately when the event starts. Alternatively, if a particular device is having problems accessing the Internet during an event, rather than calling support staff on the phone, other users at the event such as event organizers may directly access UI screen 200 and update the reservation-specific network settings to automatically log in the device according to its unique device identifier (e.g., MAC address).

In an advantageous embodiment, specific registered user devices may be shared within an event while still maintaining isolation between other user devices 124. The above examples have focuses on a shared printer 240; however, similar benefits apply to other types of user devices 124 that may be brought to an event such as file servers, web servers, database servers, screen projectors, gaming consoles, etc.

In an advantageous embodiment, the system controller 102 may apply reservation-specific network configurations to network components both on and off the hotel LAN 104 without requiring the network components themselves to support reservations or events. For example, as long as the DHCP server 106, web server 108, bandwidth manager 110, APs 112, switches 114, gateway/firewall 116, and external component(s) 120 shown in FIG. 1 allow remote configuration such as by SNMP, SSH, telent, web access, etc., their respective configurations may be changed at any time to activate reservation-specific network settings by the system controller 102. This is beneficial to reduce the cost of the system 100 because it may be constructed using existing and low-cost network components that already support remote configuration.

In an advantageous embodiment, only a single reservation table 140 need be maintained, which facilitates backup and recovery in the case of a failure. As shown in FIG. 1, the system controller 102 includes the reservation table 140 in storage device 134. The system controller 102 actively sends configuration commands to dynamically reconfigure the various network components as events begin and end, and when changes are made during an event. Reservation-specific network settings for all events may be stored in a single set of data on a single device (e.g., event reservations table 140 on storage device 134). Although each network component may store current configuration settings 150, 152, 154, 156, 158, 160, 162 in a local non-volatile memory, these are only the current settings as determined by the system controller 102. There is no need to manage multiple copies of the reservation-specific network settings or pre-program multiple network components with time-based event reservation settings. Reliability of system 100 is thereby increased because at any time the network components are only configured with settings pertaining to current events rather than all future (i.e., pending) events.

In an advantageous embodiment, event organizers may make changes to the event reservations via the UI screen 200 at any time—even while the event is in progress. As shown at step 308 in FIG. 3, when a change to the reservation-specific network settings is made during the time the event is already in progress, the system controller 102 may dynamically reconfigure the affected network components to deactivate the previous settings and activate the updated settings according to the changes made at UI screen 200. This provides greater control to event organizers and other users such as hotel staff and support staff to correct mistakes in the original event reservation or to upgrade settings such as bandwidth during the event when needed.

In an advantageous embodiment, hospitality establishments do not need to predefine and sell a single event structure using a statically-configured computer network. Instead, each event may have its own customized reservation-specific network settings, and the system 100 dynamically configures itself as events start and finish to activate and deactivate those settings. This benefits customers of the hospitality establishment such as event organizers because the computer network may be tailored to the requirements of the event. Additionally, because the customers may directly setup and support their own events via a UI screen 200 such as illustrated in FIG. 2, event setup, support and maintenance costs of the hospitality establishment may be reduced.

In an advantageous embodiment, registered user devices such as the teleconferencing web cam 242 in FIG. 2 that are assigned public IPs do not need to first login and then be rebooted or reconnected to the network in order to get the public IP address. Instead, the system controller 102 pre-configures the DHCP server 106 when the event start time 206 of the event is reached so that the system is ready to assign the public IP to the registered device upon first connection. For example, when the web cam 242 is connected to the hotel network during the event, it immediately receives its designated public IP address 238. Similar techniques may also be applied in other configurations to assign a particular private IP address to a registered device if the hospitality establishment wishes to offer specific private IP address assignment as a possible reservation-specific network setting. For example, the event organizer may wish to configure a fileserver to have a known private IP address during the event to facilitate connection to the fileserver from another user device 124 during the event.

Although the above description has focused on reservations related to events held at the hospitality establishment such as meetings and conferences, the invention is also applicable to individual guest reservations at the hospitality establishment. For example, in some embodiments, a guest may make a reservation at the hospitality establishment such as when a guest books a guest room for vacation or business trip. During the reservation process, the guest may be able to specify reservation-specific network settings such as those illustrated in FIG. 2.

Although some of the general settings illustrated in FIG. 2 are tailored to events and may not be applicable to individual guest reservations, the registered device settings shown in FIG. 2 are applicable to individual guest reservations and beneficially allow individual guests to register specific user devices. For instance, a guest may plan to bring an electronic gaming console such as an Xbox™ along with them on a trip in order to be able to play online games during downtime spent at the hotel. As the games are online games, the electronic gaming console requires Internet 118 connectivity during the guest's stay at the hotel.

To prevent the need for the guest to use a web-browser mode of the gaming console in order to login at the hotel's web-based login portal, the guest may specify the device identifier (e.g., MAC address) of the gaming console in column 230 and check the auto login setting 232 on UI screen 200 as a part of the guest's reservation process. These registered device settings may be stored in the reservation table 140. The system controller 102 then automatically configures the gateway/firewall 116 when the start time 206 of the guest's reservation is reached in order to clear the gaming console's MAC address for Internet 118 access such as by adding a device-specific exception to the login rule. When the end time 208 of the guest's reservation is reached the system controller 102 automatically configures the gateway/firewall 116 in order remove the gaming console's MAC address exception and thereby prevent it from obtaining Internet 118 access without first logging in.

Similar benefits apply other types of user devices 124 the guest may wish to bring to the hotel, for example, user devices 124 that cannot log in at the hotel's web-based login portal such as those described in the background section. In some embodiments, the settings may be automatically applied by the system controller 102 to the guest's registered room similar to how the above-described event reservation settings were applied to the location(s) 210 of the event.

In some embodiments, rather than requiring guests to specify the device identifiers of registered user devices in the reservation process, the guest may instead setup a user profile that is utilized by a plurality of hospitality establishments. The user profile may be centrally stored at a storage device at a user profile server such as one of the external network components 120 in FIG. 1. The guest's reservation at the hotel may be linked to the guest's individual user profile by a common user identifier such as a loyalty program membership identifier.

FIG. 8 illustrates a UI screen 800 allowing modification of information stored in a user profile database for an exemplary user according to an exemplary embodiment. In this embodiment, each guest of the hotel may access UI screen 800 being a webpage in order to modify the device identifiers associated with their user profile. The UI screen 800 may be generated by UI module 138 or by another external network component 120 such as a central user profile server to users over the Internet 118.

As shown in FIG. 8, each user may have any number of user devices 124 associated with their user profile account. User device names are listed in column 802 with each user device's corresponding device identifier (e.g., MAC address) shown in column 804. These fields are editable by the user, and the user may add new user devices or remove user devices to their user profile at any time.

The UI screen 800 further allows each guest of the hotel to modify user identifiers associated with their account in columns 810, 812, and 814. The user identifiers associated with a particular account in this example are all the various loyalty program membership numbers utilized by the user at different hospitality establishments. Each hospitality establishment is listed in column 810 with the user's corresponding loyalty program member identifier and user type at the specific hospitality establishment listed in columns 812 and 814, respectively. In some embodiments, the user may be able to freely adjust the loyalty number in column 812, but may need to perform an upgrade process by clicking an "upgrade" button 820 in order to upgrade to higher user type at a particular hospitality establishment in order to change the user type value in column 814. The upgrade process may involve a payment.

Before accessing UI screen 800, users may need to authenticate themselves to either the UI module 136 or a user profile server (e.g., one of the external network components 120 in FIG. 1) such as by entering a username/password combination. Additionally, in addition to user access, staff at the hotel and administrators of the user profile server may be able to access the UI screen 800 for any user account in order to assist users when required.

With reference to FIG. 3, an exemplary use case scenario of this embodiment involves a user creating a user profile by interacting with UI screen 800 before step 300. The user stores on their user profile the MAC addresses of the electronic devices they will bring to the hotel and for which they want to have the hotel's HSIA service automatically activated. The user further stores the loyalty program number identifiers belonging to the user at the various hospitality establishments at which the user will be a guest. The user then makes a reservation at a hotel and provides the hotel with the user's loyalty program number identifier applicable to that hotel chain. In some embodiments a registered device settings on the hotel reservation allows the user to specify that they wish all the user devices on their user profile to be automatically cleared through the hotel's gateway/firewall 116 when the reservation start time is reached.

At step 300, the user's pending reservation becomes a current reservation (i.e., the scheduled check-in date/time is reached).

At step 302, the controller module 136 loads the reservation details from the reservation table 140. As previously mentioned, the reservation details include the user's loyalty program member identifier as the user identifier. The controller module 136 therefore queries a user profile database (e.g., stored on a user profile server such as external network component 120 in FIG. 2) via the Internet 118 to determine whether there is a user profile listing one or more registered user device settings associated with the user's identifier (e.g., loyalty program member identifier).

As shown in FIG. 8, in some embodiments each hospitality establishment has a unique site identifier utilized when querying the user profile database in order to obtain the MAC address(es) associated with the user's loyalty program member identifier at the specific hospitality establishment where the reservation was made. For example, with reference to FIG. 8, when the user is staying at the "Galactic Hotel (4)", the user identifier (122-32-2345) is determined to be associated with the various MAC addresses of the user's associated devices in column 804. Alternatively, when the user is staying at the "Beaches Resort (135)", user identifier ("5E3DA7") is determined to be associated with the same MAC addresses in column 804. The user may thereby travel to different hospitality establishments having different types of the loyalty program member identifiers, and the user's various user devices are recognized and correlated to the user's respective user identifier as employed at each of the different hospitality establishments.

After determining the various MAC address(es) associated with the user's user identifier (e.g., loyalty program member identifier), control then proceeds to step 304. The flowchart of FIG. 3 thereafter proceeds in a similar manner as previously described. In particular, at step 306, the various MAC addresses found associated with the user's loyalty program member identifier are cleared through the gateway/firewall 116. In this way, these devices will not be required to log in at the hotel's web-based login portal while the user's reservation is current at the hotel.

In some embodiments, further information retrieved from the user profile may be utilized when reconfiguring network components at the hotel. For example, service entitlements of the HSIA service at the hotel may be automatically set by the controller module 136 according to the user type column 814 shown in FIG. 9. In this way, when the user's reservation starts at a hospitality establishment at which the user is a "VIP", the controller module 136 automatically configures the gateway/firewall 116 to clear the MAC addresses in column 804 for Internet 118 access and configures the bandwidth manager 110 to give these MAC addresses a preferential bandwidth allotment. Alternatively, when the user's reservation starts at a hospitality establishment at which the user is a "Regular user", the controller module 136 automatically configures the gateway/firewall 116 to clear the MAC addresses in column 804 for Internet 118 access but does not configure the bandwidth manager 110 to give these MAC addresses a preferential bandwidth allotment.

In other embodiments, the service entitlements may be set according to the room type for which the user is registered. For example, the room type of the user's assigned guest room may be retrieved by the controller module 136 from a property management system (PMS) at the hotel.

In summary, an exemplary system for automatically configuring a computer network at a hospitality establishment with reservation-specific settings includes a storage device for storing details of a plurality of reservations of a hospitality establishment. A particular reservation includes a registered device setting for affecting behavior of a computer network at the hospitality establishment toward a user device having a specified device identifier. The system further includes a clock unit for tracking time, and a system controller coupled to the computer network and having access to the storage device and the clock unit. The system controller automatically configures one or more network components of the computer network when a start time of the particular reservation is reached in order to activate the registered device setting, and automatically configures the one or more network components when an end time of the particular reservation is reached in order to deactivate the registered device setting.

Although the invention has been described in connection with a preferred embodiment, it should be understood that various modifications, additions and alterations may be made to the invention by one skilled in the art. In one modification, a central system controller may dynamically reconfigure network components at a plurality of different hospitality establishments. For example, the system controller 102 of FIG. 1 may be placed outside the hospitality establishment such as on the Internet 118 so it can thereby communicate with the network components of a plurality of hospitality establishments. The gateway/firewall 116 at each establishment may be preconfigured to allow the central system controller to communicate with network components on the establishment's LAN. In this embodiment, the locations setting 210 in FIG. 2 and the location table 142 in FIG. 5 may further associate network components with the different hospitality establishments. The central system controller may further select the affected network components to be configured as a particular reservation starts and ends according to the hospitality establishment at which the particular reservation is held.

In another example modification, instead of the system controller 102 directly accessing the internal clock unit 132 and the internal storage device 134 as illustrated in FIG. 2, the clock unit 132 and storage device 134 may be located external to the system controller and accessed by the system controller 102 via the LAN 104 and/or Internet 118.

In another example modification, rather than storing a specific start time 206 and end time 208 for each event in the reservation table 140, the end time may be calculated as start time plus a particular duration, or start time may be calculated as end time minus a particular duration.

Although the invention has been described as being utilized at a hotel, the invention is equally applicable to any hospitality related establishment or service wishing to customize a computer network with reservation-specific network settings including but not limited to hotels, motels, resorts, conference centers, hospitals, apartment/townhouse complexes, restaurants, coffee shops, retirement centers, cruise ships, busses, airlines, shopping centers, passenger trains, etc. The invention may also be beneficially employed in other applications outside the hospitality industry such as by corporations or any other entity wishing to customize a network for different reservations.

The various separate elements, features, and modules of the invention described above may be integrated or combined into single units. Similarly, functions of single elements, features, and modules may be separated into multiple units.

The modules may be implemented as dedicated hardware modules, and the modules may also be implemented as one or more software programs executed by a general or specific purpose processor to cause the processor to operate pursuant to the software program to perform the above-described module functions. For example, the system controller 102 of FIG. 1 may be implemented by a computer server having one or more processors 130 executing a computer program loaded from a storage media such as storage device 134 to perform the above-described functions of the controller module 136 and UI module 138.

The flowcharts may be implemented as processes executed by dedicated hardware, and may also be implemented as one or more software programs executed by a general or specific purpose processor(s) to cause the processor(s) to operate pursuant to the software program to perform the flowchart steps. In this way, a tangible computer-readable medium stores computer executable instructions that when executed by a computer cause the computer to perform above-described steps and sub-steps of FIG. 3 and FIG. 6. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network. For example, the system controller 102 of FIG. 1 may be implemented by a computer having one or more processors 130 executing a computer program loaded from a hard drive located within the computer or elsewhere to perform the steps of the various flowcharts and above description. In one embodiment, the computer is a computer server connected to a network such as the Internet 118 and the computer program stored in the hard drive may be dynamically updated by an update server (not shown) coupled to the Internet 118. In addition to a dedicated physical computing device, the word "server" may also mean a service daemon on a single computer, virtual computer, or shared physical computer, for example.

Unless otherwise specified, features described may be implemented in hardware or software according to different design requirements. Additionally, all combinations and permutations of the above described features and embodiments may be utilized in conjunction with the invention.

What is claimed is:

1. A controller for configuring reservation-specific network settings at a hospitality establishment, the controller comprising:
   a storage device storing a plurality of reservations for the hospitality establishment;
   a communications interface providing access to a computer network at the hospitality establishment;
   an access controller performing access control between the computer network and an external network;
   a clock chip tracking time; and
   one or more processors coupled to the storage device, the communications interface, and the clock chip;
   wherein, by the one or more processors executing software instructions loaded from the storage device, the one or more processors are configured to:
   when a start time of one of the reservations is reached, assign the one of the reservations to a virtual area network (VLAN) and dynamically configure a network component via the computer network to thereby cause the network component to place on the VLAN network traffic associated with one or more user devices accessing the computer network via the network component;
   dynamically configure the access controller to thereby cause the access controller to allow at least one of the one or more user devices on the VLAN to gain access to the external network without requiring the at least one of the one or more user devices to perform a predetermined login process;
   when an end time of the one of the reservations is reached, de-assign the one of the reservations from the VLAN and dynamically configure the network component to thereby cause the network component to stop placing network traffic associated with the one or more user devices on the VLAN; and
   dynamically configure the access controller to thereby cause the access controller to prevent the at least one of the one or more user devices on the VLAN from gaining access to the external network without first completing the predetermined login process.

2. The controller of claim 1, wherein the one of the reservations corresponds to an event taking place at the hospitality establishment during which a plurality of user devices gain access to the computer network via the network component.

3. The controller of claim 1, wherein:
   the network component is an access point; and
   when the start time of one of the reservations is reached, the one or more processors dynamically configure the access point to begin broadcasting a custom SSID for the one of the reservations and to place network traffic associated with the custom SSID on the VLAN.

4. The controller of claim 1, wherein:
   the network component is a switch;
   the switch has a plurality of ports providing network connectivity at a plurality of different locations of the hospitality establishment;
   when the start time of one of the reservations is reached, the one or more processors dynamically configure the switch to place on the VLAN network traffic sent via only a subset of the ports; and
   each of the subset of the ports is associated with one or more locations where the one of the reservations is taking place.

5. The controller of claim 1, wherein:
   the storage device stores a plurality of VLANs available on the computer network; and
   when the start time of one of the reservations is reached, the one or more processors automatically select an unused one of the VLANs for assignment to the one of the reservations.

6. The controller of claim 5, wherein at any given time, at most one of the reservations is assigned to each of the VLANs.

7. The controller of claim 6, wherein the network component isolates network traffic on a first one of the VLANs from network traffic on a second one of the VLANs.

8. The controller of claim 1, wherein, when the start time of the one of the reservations is reached, the one or more processors dynamically configure the access controller to thereby cause the access controller to allow all the one or more user devices on the VLAN to gain access to the external network without requiring the one or more user devices to perform the predetermined login process.

9. A controller for configuring reservation-specific network settings at a hospitality establishment, the controller comprising:
   a storage device storing a plurality of reservations for the hospitality establishment;
   a communications interface providing access to a computer network at the hospitality establishment;
   a clock chip tracking time;
   a bandwidth manager; and
   one or more processors coupled to the storage device, the communications interface, and the clock chip;
   wherein, by the one or more processors executing software instructions loaded from the storage device, the one or more processors are configured to:
   when a start time of one of the reservations is reached, assign the one of the reservations to a virtual area network (VLAN) and dynamically configure a network component via the computer network to thereby cause the network component to place on the VLAN network traffic associated with one or more user devices accessing the computer network via the network component;

dynamically configure the bandwidth manager to thereby cause the bandwidth manager to limit a bandwidth of network traffic of the one or more user devices on the VLAN;

when an end time of the one of the reservations is reached, de-assign the one of the reservations from the VLAN and dynamically configure the network component to thereby cause the network component to stop placing network traffic associated with the one or more user devices on the VLAN; and dynamically configure the bandwidth manager to thereby cause the bandwidth manager to stop limiting the bandwidth of network traffic of the one or more user devices on the VLAN.

10. The controller of claim 9, wherein when the start time of the one of the reservations is reached, the one or more processors dynamically configure the bandwidth manager to thereby cause the bandwidth manager to limit the bandwidth of all the one or more user devices on the VLAN.

11. A system for configuring reservation-specific network settings at a hospitality establishment, the system comprising:
a storage device storing a plurality of reservations for the hospitality establishment;
a network component providing access to a computer network at the hospitality establishment;
an access controller performing access control between the computer network and an external network;
a clock chip tracking time; and
a controller coupled to the network component and having access to the storage device and the clock chip;
wherein when a start time of one of the reservations is reached, the controller automatically assigns the one of the reservations to a virtual area network (VLAN) and configures the network component to thereby cause the network component to place on the VLAN network traffic associated with one or more user devices gaining access to the computer network via the network component;
the controller dynamically configures the access controller to thereby cause the access controller to allow at least one of the one or more user devices on the VLAN to gain access to the external network without requiring the at least one of the one or more user devices to perform a predetermined login process;
when an end time of the one of the reservations is reached, the controller automatically de-assigns the one of the reservations from the VLAN and configures the network component to thereby cause the network component to stop placing network traffic associated with the one or more user devices on the VLAN; and
the controller dynamically configures the access controller to thereby cause the access controller to prevent the at least one of the one or more user devices on the VLAN from gaining access to the external network without first completing the predetermined login process.

12. The system of claim 11, wherein the one of the reservations corresponds to an event taking place at the hospitality establishment during which a plurality of user devices gain access to the computer network via the network component.

13. The system of claim 11, wherein:
the network component is an access point; and
when the start time of one of the reservations is reached, the controller dynamically configures the access point to begin broadcasting a custom SSID for the one of the reservations and to place network traffic associated with the custom SSID on the VLAN.

14. The system of claim 11, wherein:
the network component is a switch;
the switch has a plurality of ports providing network connectivity at a plurality of different locations of the hospitality establishment;
when the start time of one of the reservations is reached, the controller dynamically configures the switch to place on the VLAN network traffic sent via only a subset of the ports; and
each of the subset of the ports is associated with one or more locations where the one of the reservations is taking place.

15. The system of claim 11, wherein:
the storage device stores a plurality of VLANs available on the computer network; and
when the start time of the one of the reservations is reached, the controller automatically selects an unused one of the VLANs for assignment to the one of the reservations.

16. The system of claim 11, wherein, when the start time of the one of the reservations is reached, the controller dynamically configures the access controller to thereby cause the access controller to allow all the one or more user devices on the VLAN to gain access to the external network without requiring the one or more user devices to perform the predetermined login process.

17. The system of claim 11, further comprising:
a bandwidth manager;
wherein when the start time of the one of the reservations is reached, the controller dynamically configures the bandwidth manager to thereby cause the bandwidth manager to limit a bandwidth of network traffic of the one or more user devices on the VLAN; and
wherein when the end time of the one of the reservations is reached, the controller dynamically configures the bandwidth manager to thereby cause the bandwidth manager to stop limiting the bandwidth of network traffic of the one or more user devices on the VLAN.

18. The system of claim 17, wherein when the start time of the one or more reservations is reached, the controller dynamically configures the bandwidth manager to thereby cause the bandwidth manager to limit the bandwidth of all the one or more user devices on the VLAN.

19. The system of claim 11, wherein at any given time, at most one of the reservations is assigned to each of the VLANs.

20. The system of claim 11, wherein the network component isolates network traffic on a first one of the VLANs from network traffic on a second one of the VLANs.

* * * * *